April 28, 1970

T. O. PAINE
DEPUTY ADMINISTRATOR OF THE
NATIONAL AERONAUTICS AND
SPACE ADMINISTRATION
LATCH/EJECTOR UNIT 3,508,779

Filed July 31, 1968

INVENTOR.
STUART K. EDLESON

BY

ATTORNEYS

United States Patent Office 3,508,779
Patented Apr. 28, 1970

3,508,779
LATCH/EJECTOR UNIT
T. O. Paine, Deputy Administrator of the National Aeronautics and Space Administration, in respect to an invention of Stuart K. Edleson, Dallas, Tex.
Filed July 31, 1968, Ser. No. 749,149
Int. Cl. B64d 1/02
U.S. Cl. 294—83  8 Claims

ABSTRACT OF THE DISCLOSURE

A latching mechanism featuring a pivoting but positively engaging and quick-releasing catch, combined with a self-contained spring ejection arrangement for the latched members.

---

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention relates to a latching mechanism, particularly suited for latching members under the influence of significant separating forces.

Prior art latching mechanisms for members under heavy separation forces, such as spring or weight preloads found in bomb racks and cargo carrying devices, have usually suffered from the disadvantages of excessive release forces or times, complexity, or the lack of a positive latching or release action. The first of these disadvantages arises from the usual arrangement wherein a load-weight catch must slide on a cooperating surface in order to effect a release. Since the load may be very heavy, frictional forces can be considerable, even in situations in which the catch carries only a portion of the loads, resulting in either a mechanism difficult to operate or the necessity for the inclusion of complicating power or linkage assists in order to reduce these forces to a reasonable level. Other attempts to overcome this disadvantage have usually resulted in a loss of positive latching and/or release action, release time increase, or have introduced similarly complicating structure. These disadvantages are likewise unacceptable in many situations in which latch failure may be disastrous and in which weight or simplicity requirements are severe.

Therefore, it is an object of the present invention to provide a latch which incorporates a catch mechanism which releases without overcoming a large frictional load.

It is a further object to provide such a device which positively secures the latched members.

It is another object to provide such a positive acting latch mechanism which is also quick-engaging and quick-releasing.

It is yet another object of the present invention to provide a simple and effective self-contained latching and separating unit for selective connection of a pair of members.

These and other objects which will become apparent upon a reading of the claims are accomplished by providing a latch assembly having a catch element which is operatively connected to one member and rotates into engagement with a similarly rotating complementary element operatively connected to the other member. A tension spring is arranged to bias these elements into latching engagement when they are substatnially engaged but is so interconnected with the operating linkage to become ineffective at a given point in the release motion so as to allow uninhibited and rapid release. The unit also includes a pair of intermediate plate members detachable from the primary members which the latching elements are to secure, these plates having their own self-contained separating bias, producing both more certain separation and a positive latch release.

Figure 1:
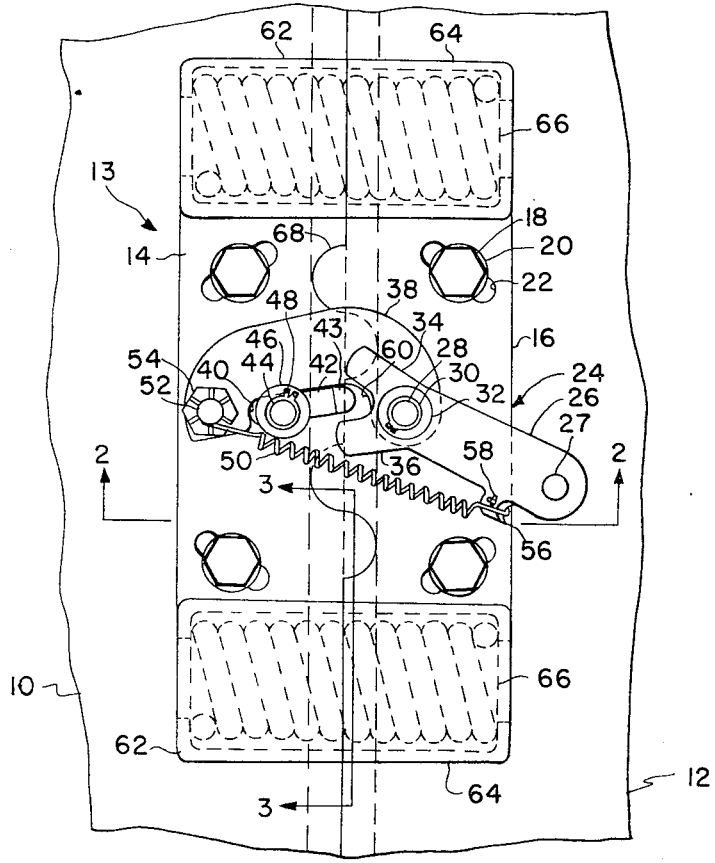
FIG. 1 is a plan view of the latch assembly installed, with a fragmentary view of the primary members to which the assembly is secured.

Referring now to the drawings, plates 10 and 12 represent the primary members which are desired to be detachably secured to each other. The latch/ejector unit 13 includes left and right base plates 14 and 16 which are detachably secured to a respective primary plate by means of bolts 18, nuts 19 (FIG. 2), and washers 20 and 21 passing through slots 22 in the base plates 14 and 16 and holes in the primary members 10 and 12.

In order to insure separation of the primary members 10 and 12, a resilient separating bias is applied by means of springs 66, compressed in spring housings 62 and 64 integral with the base plates 14 and 16 when the respective base plates have been secured to the primary members 10 and 12. The base plates 14 and 16 may be clamped together prior to securing them to the primary members with the springs 66 so as to obviate the necessity of compressing them at the time the primary members 10 and 12 are assembled together.

Base plates 14 and 16 are provided with complementary tabs 68 in order to insure against relative movement of the members 10 and 12 in directions other than along that of separation, and also to maintain a lateral spacing of link assembly components, as will be further explained herein.

The interlocking latching mechanism 24 includes a striker arm 26, having a hole 27 therein at one end for connection of an operating linkage or cable (not shown). The striker arm 26 is pivotally connected to base plate 16 by means of a pin 28, and retained thereon with a washer 32 and snap retainer 30.

Also pivotally connected to base plate 16 by means of the pin 28 through one of its legs is U-shaped hook member 38. The striker arm 26 and the hook are interconnected by a tension spring 50, connected to the striker arm 26 by the spur 56 and hole 58 and to the hook 38 by looping through the screw 52, retained by the nut 54. This spring is under tension when the striker arm 26 and the hook 38 are in the relative position shown in FIG. 1

Toggle link 42 is pivotally connected to the left hand base plate 14 by the pin 44, and rotatably retained by means of the snap retainer 48 and washer 46.

Figure 4:
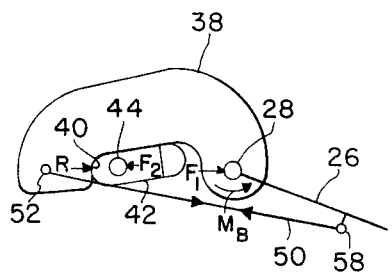
FIG. 4 is a schematic drawing of the mechanism in the locked position.
Figure 4A:
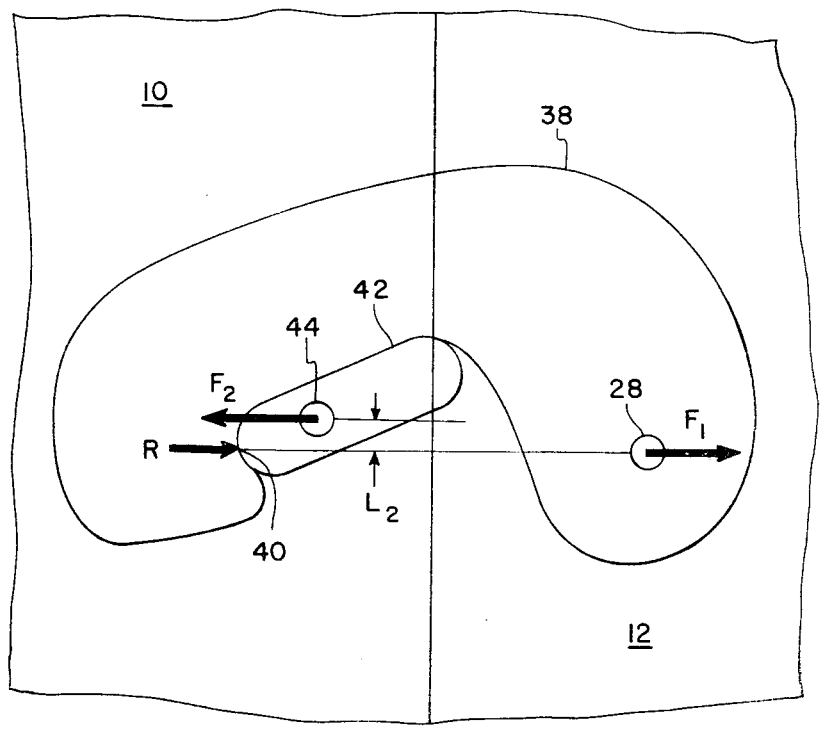
FIG. 4a is an enlarged schematic drawing of the mechanism in the locked position.

As best seen in FIG. 4a, pins 44 and 28 are positioned by the tabs 68 to be slightly out of line, as measured from the perpendicular of the mating edges of base plates 10 and 12, in order to produce a locking moment, as will herein be more fully explained.

Toggle link 42 and hook 38 are shaped to produce a contact at point 40 on one of the legs of the hook 38 when these members are in the engaged position shown in FIG. 1, and thus are analogous to the catching elements in the ordinary latching mechanism.

Figure 2:
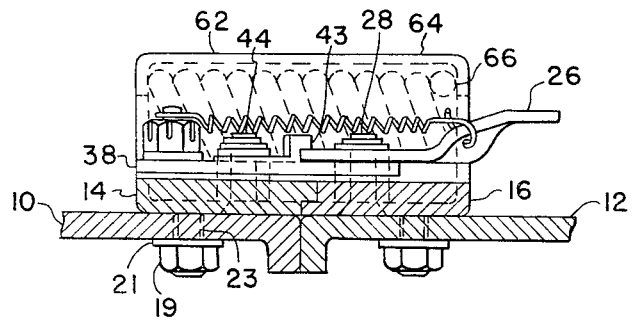
FIG. 2 is a view of the section taken along the line 2—2.
Figure 3:
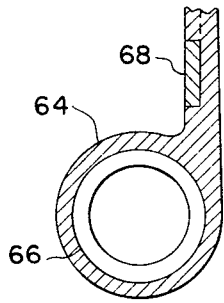
FIG. 3 is a view of the section taken along the line 3—3.

Striker arm 26 and toggle link 42 are designed to cooperate with each other by means of a striker arm extension 34 and proturberance 43 on the toggle link 42, which extends upwardly into the plane of the striker arm 26, as best seen in FIG. 2, in order to cooperate with surface 60 when the striker arm 26 is rotated in a counterclockwise direction, as viewed in FIG. 1.

OPERATION

Figure 5:
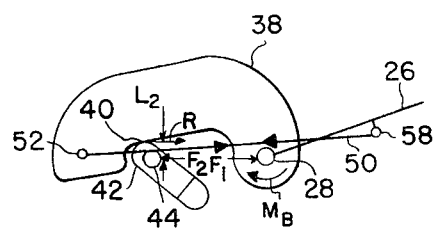
FIG. 5 is a schematic drawing of the mechanism in an intermediate position.

From the above description, and reference to schematics, FIGS. 4, 4a and 5, the functioning of the latch/ejector unit should be clear. As shown in FIG. 4, the latch/ejector unit is in the locked position. The separating or ejecting forces, $F_1$ and $F_2$ produced by the springs 66 acts on the latch assembly 24 through the pins 28 and 44 in opposed directions normal to the line of separation of the primary members 10 and 12. The ejection force $F_1$ produces a force R on the toggle link 42 through the contact point 40. As seen in FIG. 4a, this force, acting through lever arm $L_2$ produces a counterclockwise moment about pin 44 on toggle link 42, which in turn produces a jamming action as toggle link 42 attempts to rotate the hook about pin 44, which is resisted by pin 28. Therefore a positive interlock is produced between the two base plates 14 and 16 and their respective primary members 10 and 12.

Contact between the hook 38 and the toggle link 42 at the point 40 is insured by the bias of the tension spring 50 tending to pull hook 38 down into such engagement, by exerting a counterclockwise biasing moment $M_B$ on the hook 38 about its pivotal connection 28, as shown in FIG. 4, to counteract releasing inertial forces acting on the striker arm 26.

Additionally, the hook 38 and toggle link are dimensioned to seat against each other along the length of the toggle link 42 to accurately position the point of contact 40.

To release, the striker arm 26 is operated, moving it in a counterclockwise direction to contact toggle link 42 by surface 60 and protuberance 43. Continued movement of striker arm 26 causes clockwise pivotal movement of toggle link about its connection 44, which in turn produces camming action between the toggle link and the hook 38. This action causes the hook 38 to rotate in a clockwise direction about its connection 28, as shown in FIG. 5.

This movement of striker arm 26, toggle link 42, and hook 38 produces a double effect. Firstly, the force R produced by force $F_1$ no longer acts on the hook 38 through a point below pin 44 as seen in FIG. 4, but rather at a point somewhat above this pin, as shown in FIG. 5. And, since the contact point 40 is on the toggle link 42 at a point about its connection 44 remote from the other connection 28, movement of the contact point out of alinement with the pins results in the force R tending to produce rotation of toggle link 42 about its pivot point as well as rotation of hook 38 about its pivot point, through a lever arm $L_2$. Once this force equals the countering force of spring 50, this in turn precipitates a rapid disengagement of these members as they spin off each other, since this rotational force increases with increasing rotational movement, due to the increasing effective lever arm $L_2$ as seen in FIG. 5.

The second effect of this movement of the respective members 26, 42 and 38 is a reversing of the biasing effect of tension spring 50. It can readily be seen that as points 58 and 52 both move upwardly due to the movement of members 38 and 26 the spring 50 will eventually exert a biasing moment $M_B$ in a clockwise direction as shown in FIG. 5. The components are so designed that the spring 50 will so reverse its biasing effect at the point of incipient release, and therefore, the toggle link 42 and hook 38 are free to complete their disengagement without any opposing forces due to the spring 50, and indeed, is aided by the effect of the tension spring 50.

Hence, a latching mechanism has been provided which positively and securely maintain a connection between two members in its operative position, but rapidly and surely acts to release these members when it is desired to do so. Further, the disengaging movement of the catching elements (toggle link 42 and hook 38) does not involve the usual linear sliding under the separation force load, but rather a friction-reducing rotation of parts, resulting in relatively low forces required to release the latch. This has been accomplished with a minimum number of parts of a very simple nature. Furthermore, these low operating forces together with a relatively small operating movement allows a plurality of these mechanisms to be arranged about a pair of primary bodies and operated by a single lever or cable, connected by pins to the striker arms 26, permitting simultaneous release. Thus, a number of these latching mechanisms have been successfully utilized to release heat shielding sections from a rocket vehicle, with all of the attendant advantages pointed out above.

It is to be noted at this point that the arrangement shown is merely a specific embodiment and the invention is not to be limited to this particular device. Furthermore, the latching mechanism is useful in other contexts than the spring-loaded separation arrangement, but could be used in a weight-loaded context, such as a cargo release device, or indeed, even though especially advantageous and effective in these areas of high separation forces, can be used in applications in which the separation forces are negligible.

What is claimed as new and desired to be secured by Letters Patent of the United States is:

1. A latching mechanism for locking together a pair of primary members subjected to separating forces comprising:
   a first and second element pivotally connected to a respective primary member;
   engagement means providing for engagement of said first element with said second element upon continued rotation in at least one direction of said first element;
   means for producing a moment tending to rotate said first element about said second element's pivotal connection due to separating forces acting through said first element on said second element by said engagement means, whereby a positive catch is provided.

2. The latch of claim 1 further including means biasing said first element into engagement with said second element when said elements are engaged.

3. The latch of claim 2 wherein said biasing means includes means reversing the biasing force upon continued movement of said one element about its pivotal connection in a direction to effect disengagement.

4. The latch of claim 1 wherein said engagement means includes a hook-shaped end on said one element.

5. The latch of claim 1 further including release means including cooperating surfaces on said elements to produce rotation of said first element in response to rotation of said second element when said elements are engaged in a direction tending to disengage said elements.

6. The latch of claim 5 wherein said release means further includes a striker arm pivotally connected to a primary member and adapted to engage said other element and produce rotation of said element in response to rotation of said striker arm about its connection.

7. The latch of claim 6 wherein said striker arm is pivotally connected to the primary member to which said other element is pivotally connected, and further including a resilient member connected at one end to said striker arm and at the other to said first element.

8. The mechanism of claim 1 wherein said moment-producing means includes means for preventing separating movements of said primary members in a direction parallel to a line connecting said pivotal connections.

References Cited
UNITED STATES PATENTS
3,081,121   6/1960   Campbell.

EVON C. BLUNK, Primary Examiner

A. N. GOODMAN, Assistant Examiner.

U.S. Cl. X.R.

292—341.17